United States Patent
Pandit et al.

(10) Patent No.: US 8,121,593 B2
(45) Date of Patent: Feb. 21, 2012

(54) SYSTEM AND METHOD FOR AIR-TO-AIR COMMUNICATIONS USING NETWORK FORMED BETWEEN AIRCRAFT

(75) Inventors: Anil Kumar Pandit, Bangalore (IN); Nagraj Sham, Bangalore (IN); Srikanth Rao, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 657 days.

(21) Appl. No.: 12/246,681

(22) Filed: Oct. 7, 2008

(65) Prior Publication Data

US 2010/0087190 A1 Apr. 8, 2010

(51) Int. Cl.
H04W 4/00 (2009.01)
(52) U.S. Cl. ......... 455/431; 370/316; 709/223; 709/230
(58) Field of Classification Search .................. None
See application file for complete search history.

(56) References Cited

U.S. PATENT DOCUMENTS

| | | | |
|---|---|---|---|
| 5,530,909 A | 6/1996 | Simon et al. | |
| 6,285,878 B1 | 9/2001 | Lai | |
| 7,085,562 B1 | 8/2006 | Holder et al. | |
| 7,103,456 B2 | 9/2006 | Bloch et al. | |
| 7,356,389 B2 | 4/2008 | Holst et al. | |
| 2002/0155833 A1* | 10/2002 | Borel | 455/431 |
| 2005/0014499 A1* | 1/2005 | Knoblach et al. | 455/431 |
| 2005/0108374 A1* | 5/2005 | Pierzga et al. | 709/223 |
| 2005/0111647 A1* | 5/2005 | Mashinsky | 379/210.01 |
| 2006/0030311 A1* | 2/2006 | Cruz et al. | 455/431 |
| 2006/0264242 A1* | 11/2006 | Dent | 455/562.1 |
| 2007/0042773 A1 | 2/2007 | Alcorn | |
| 2007/0042774 A1 | 2/2007 | Alcorn | |
| 2007/0072590 A1 | 3/2007 | Levitan | |
| 2007/0232299 A1* | 10/2007 | Alcorn | 455/431 |
| 2008/0070517 A1* | 3/2008 | Brady et al. | 455/98 |
| 2008/0117858 A1 | 5/2008 | Kauffman | |
| 2009/0070841 A1* | 3/2009 | Buga et al. | 725/116 |

FOREIGN PATENT DOCUMENTS

EP 1793512 6/2007

OTHER PUBLICATIONS

Jerry Knoblach, Balloon Telemetry and Communications from Small Balloon, LOCANS Conference, Apr. 27, 2006, slides 1-40.*
Proximetry, "Gatesync", "www.proximetry.com", 2007, Publisher: Proximetry Inc.

* cited by examiner

*Primary Examiner* — Rafael Pérez-Gutiérrez
*Assistant Examiner* — German Viana Di Prisco
(74) *Attorney, Agent, or Firm* — Fogg & Powers LLC (57) ABSTRACT

A system and method for aircraft communications is provided. The system includes a first wireless base station deployed in a first aircraft and configured to establish one or more wireless links, and a second wireless base station deployed in a second aircraft and configured to establish one or more wireless links. At least one ground-based wireless base station is configured to operatively communicate with the first wireless base station or the second wireless base station while the first aircraft and the second aircraft are in flight. During flight, the first and second wireless base stations establish one or more wireless links with each other to create a wireless network for air-to-air communication. When one of the first or second aircraft is out of range with the ground-based wireless base station and the other aircraft is in range with the ground-based wireless base station, the aircraft that is out of range can send a message to the ground-based wireless base station through the aircraft that is in range.

18 Claims, 6 Drawing Sheets

SYSTEM AND METHOD FOR AIR-TO-AIR COMMUNICATIONS USING NETWORK FORMED BETWEEN AIRCRAFT

BACKGROUND

Aircraft currently use different subnetworks for air-to-air and air-to-ground communications in different phases of flight. The different subnetworks include very high frequency (VHF), high frequency (HF), and SATCOM networks. Main service providers for these subnetworks that allow communications between aircraft and aircraft/ground include ARINC and SITA.

With increasing air traffic, communication costs are also increasing for the airlines as the quantum of messages directly increases with the number of aircraft. Because of the high costs in using the subnetworks, communications are typically restricted to only the basic requirements, such as ACARS messaging and communications with air traffic control (ATC) or aeronautical operational control (AOC). With technology improvements, the demand for personal phone, facsimile, internet, and entertainment have also increased. If an airline does not meet such demands, the airline may lose business.

An airline pays a service provider for every message exchange of an aircraft, which is a substantial cost for the airlines. In a free flight scenario, communications play a major role in enhancing the safety of the flight, and thus many messages are required. Airlines thus have a need for technologies that will provide cost savings for communication services typically taken from service providers like ARINC and SITA.

The existing subnetworks have low bandwidth and limited speed capability to transfer multiple block downlinks to the ground. Because of technology constraints (e.g., speed, range), most aircraft perform much of their datalink activities on the ground. An aircraft typically uses expensive avionics equipment (mainly due to higher level certifications) to perform operations and provide information to the pilot to help in navigating through various terrain, in the approach to a runway, or at an airport during taxiing to the gate. This is especially required in bad weather where there is limited or no visibility.

Further, there may not be VHF coverage while flights are en route on the oceans, and pilots need to rely on HF or SATCOM. Unfortunately, SATCOM is the costliest form of communication, and HF works on ionospheric refraction, which does not provide much voice clarity and has frequent disconnects while transmitting data.

The frequency band of existing subnetworks (mainly VHF 118-136 MHz) remains congested. This becomes more complicated during take-off and landing phases where many ATC and AOC messages are exchanged. There is also no aircraft-to-aircraft communications available, either in en route or during different phases of flight, which allow for sharing data related to traffic, weather, etc.

Accordingly, there is a need for improved aircraft communication techniques that overcome the above deficiencies.

SUMMARY

The present invention is related to a system and method for aircraft communications. The system includes a first wireless base station deployed in a first aircraft and configured to establish one or more wireless links, and a second wireless base station deployed in a second aircraft and configured to establish one or more wireless links. At least one ground-based wireless base station is configured to operatively communicate with the first wireless base station or the second wireless base station while the first aircraft and the second aircraft are in flight. When the first aircraft and the second aircraft are in flight, the first wireless base station and the second wireless base station establish one or more wireless links with each other to create a wireless network for air-to-air communication. When one of the first aircraft or second aircraft is out of range with the ground-based wireless base station and the other aircraft is in range with the ground-based wireless base station, the aircraft that is out of range can send a message to the ground-based wireless base station through the aircraft that is in range.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the present invention. The following description is, therefore, not to be taken in a limiting sense.

The present invention is directed to a system and method for air-to-air communications using a WiMax network formed between multiple aircraft, with each aircraft including a node of the network. The present system employs base stations installed in different aircraft for air-to-air networking, providing an aircraft networking solution. The present air-to-air communications network can be implemented as an additional subnetwork for use in aircraft communications, along with conventional VHF, HF, and SATCOM subnetworks that are already in place for aircraft communications.

In one embodiment, an air-to-air communications network can be implemented using the Worldwide Interoperability for Microwave Access (WiMax) protocol. The WiMax protocol is a wireless broadband technology, which supports point to multi-point (PMP) broadband wireless access. The WiMax protocol is based on the IEEE standard 802.16, and allows for higher data rates over longer distances as compared to other communications standards. A WiMax-based network can provide a network coverage radius of about 30 miles, with a data rate of about 75 megabits per second (Mbps).

Although the present disclosure focuses mainly on use of the WiMax protocol, it should be understood that other wireless protocols, such as any internet protocol (IP) based wireless networks, may be used to implement the present air-to-air communications network. Accordingly, when the following description refers to a WiMax transceiver in an embodiment, it should be understood that an IP based wireless transceiver can be used in place of the WiMax transceiver in alternative embodiments.

As used herein, the term "aircraft" can include an airplane, a hot air balloon, or the like.

When the present air-to-air communications network is implemented as a WiMAX subnetwork, it provides low cost links that can be used for different aircraft communications. These include avionics related data, aeronautical operational control (AOC) data, and air traffic control (ATC) data. Examples of such data include ACARS messages, maintenance data, air traffic data, surveillance data, central maintenance computer (CMC) functionality, retrieval of Quick Access Recorder (QAR) engine data, uplink/downlink of flight plans, uplink of weather data, uplink of terrain data, and electronic flight bags (EFBs). The present WiMAX subnetwork can also provide Voice-over-Internet protocol (VoIP), in-flight entertainment, email access, chat sessions, and Internet access for an aircraft. In addition, the Automatic Dependent Surveillance-Broadcast (ADS-B) can use the WiMax subnetwork as a wireless medium for exchanging data with aircraft and tracking stations on the ground. The WiMax subnetwork can also be used to exchange safety related data such as traffic, surveillance, and video data between aircraft.

Because of high bandwidth, larger coverage area, and high speed, the present WiMAx subnetwork can be used to downlink a large amount of multi-block data sent from different applications onboard an aircraft. The present approach uses the base standards defined in WiMax for Internet protocol (IP) based broadband data communications, but modifies the physical layer standards for making it suitable for air-to-ground and air-to-air communications. The WiMax subnetwork can relay wireless data across different aircraft in the air to ultimately deliver the data to the ground.

The WiMax subnetwork can be formed between different aircraft that are in the WiMax range, and can be used to route data to an intended destination such as an AOC center and/or ATC center. Since at any given time there is a large number of aircraft in a an airspace at a 30 mile range, the WiMax protocol can be used to route data through different aircraft and finally deliver the data to the appropriate ground server destination (e.g., ATC/AOC). The present approach provides airlines with the ability to reduce the costs incurred by paying a service provider to have all data routed to the ground.

In one embodiment, an intermediate base station is provided in the sky by deploying a WiMax transceiver in each of a plurality of airplanes, which allows for an increased coverage area. By having the WiMax transceivers in separate airplanes, the airplanes can form a WiMax wireless network on the fly, which allows for routing of data from airplane to airplane until the desired destination is reached.

In an alternative approach, a WiMax base station can be deployed in other types of aircraft or flying objects, such as in one or more hot air balloons that operate from solar energy. By deploying base stations in hot air balloons, which are controlled from the ground, the WiMax range can be increased. The hot air balloons can be deployed between an airplane flying at a maximum altitude and the ground (e.g., in the middle of the space between an in-flight airplane and the ground). This configuration helps the en route airplane to have direct connectivity with a ground-based WiMax base station.

With increased air traffic, there will be more and more aircraft in the air at any given time, which can potentially be used to route data in the WiMax subnetwork. This would reduce the cost for airlines using expensive VHF/SATCOM communication systems, and would also reduce network congestion over the VHF/SATCOM bands.

Further details of various aspects of the system and method of the invention are described hereafter with respect to the drawings.

Figure 1:
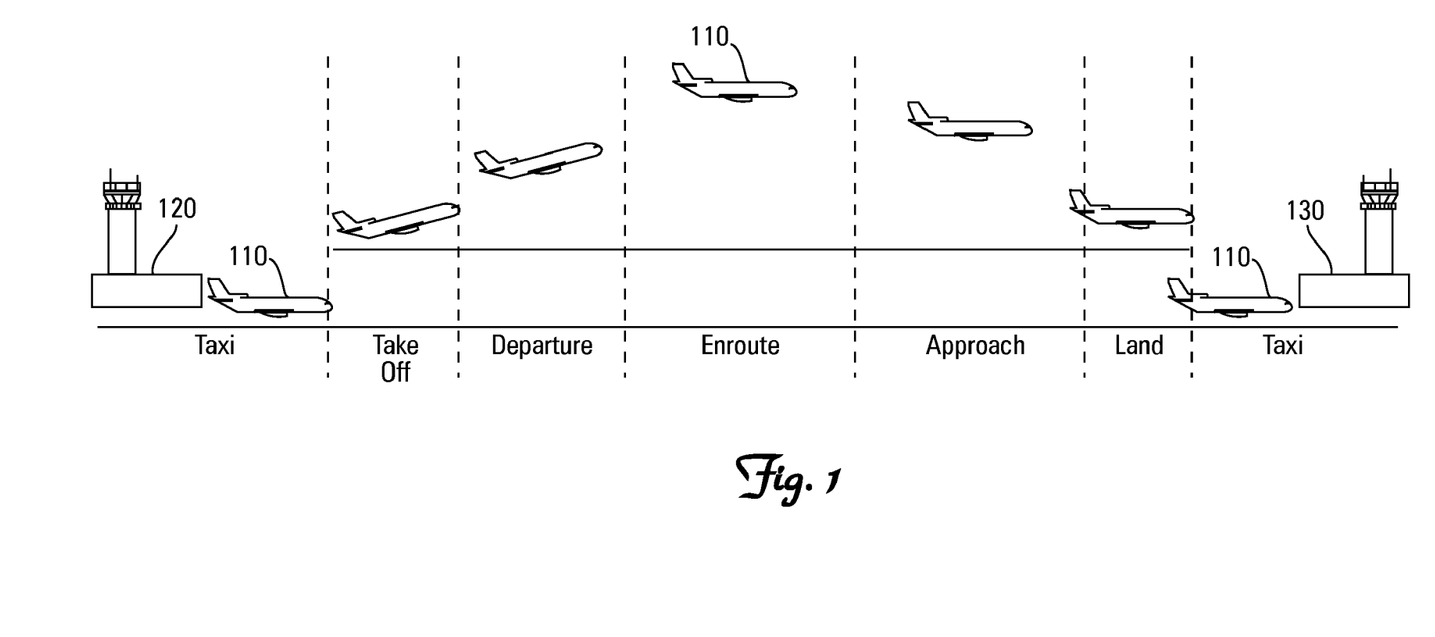
FIG. 1 illustrates the different phases of flight for a typical commercial aircraft.

FIG. 1 illustrates the different phases of flight for a typical commercial aircraft 110, which leaves an airport 120 and arrives at a different airport 130. These flight phases include taxi from the gate, takeoff, departure, en route, approach, landing, and taxi to the gate. During these flight phases, various types of data are exchanged between the aircraft and control tower or airlines in downlinks or uplinks. Examples of the various types of data are listed below with respect to each flight phase in Table 1.

TABLE 1

| TAXI FROM GATE | TAKEOFF | DEPARTURE | EN ROUTE | APPROACH | LANDING | TAXI TO GATE |
|---|---|---|---|---|---|---|
| Fuel Info (Downlink) | Traffic Information (Uplink) | Engine Data (downlink) | Position Reports (Downlink) | Gate Requests (Downlink) | Maintenance Data (Downlink) | Fault Data from CMC (Downlink) |
| Crew Info (Downlink) | Assignment of Next ATC Frequency (Uplink) | Flight Plan Updates (Uplink) | Weather Reports (Downlink) | ETA (Downlink) | Data Load Packages (Uplink) | Fuel Info (Downlink) |
| Delay Reports (Downlink) | | Weather Updates (Uplink) | Estimated Time of Arrival (ETA) (Downlink) | Engine Info (Downlink) | | Crew Info (Downlink) |
| Fault | | | Delay Info (Downlink) | Gate Assignment (Uplink) | | |
| Pre-Departure Clearance (Uplink) Automatic Terminal Information Service (ATIS) (Uplink) Airport | | | Maintenance Reports (Downlink) ATC Oceanic Clearances (Uplink) Weather | ATIS (Uplink) | | |

TABLE 1-continued

| TAXI FROM GATE | TAKEOFF | DEPARTURE | EN ROUTE | APPROACH | LANDING | TAXI TO GATE |
|---|---|---|---|---|---|---|
| Analysis (Uplink) Flight Plan (Uplink) | | | Reports (Uplink) | | | |

The data exchanged during the different phases of flight mostly involve use of a VHF subnetwork. En route air-to-ground communications occur on HF or SATCOM (if VHF is not available). Each and every message needs to be paid for by the airlines to the service provider, and this is a huge cost to the airlines. This cost can be reduced to a large extent by using the present WiMax subnetwork to send and receive data.

Figure 2A:
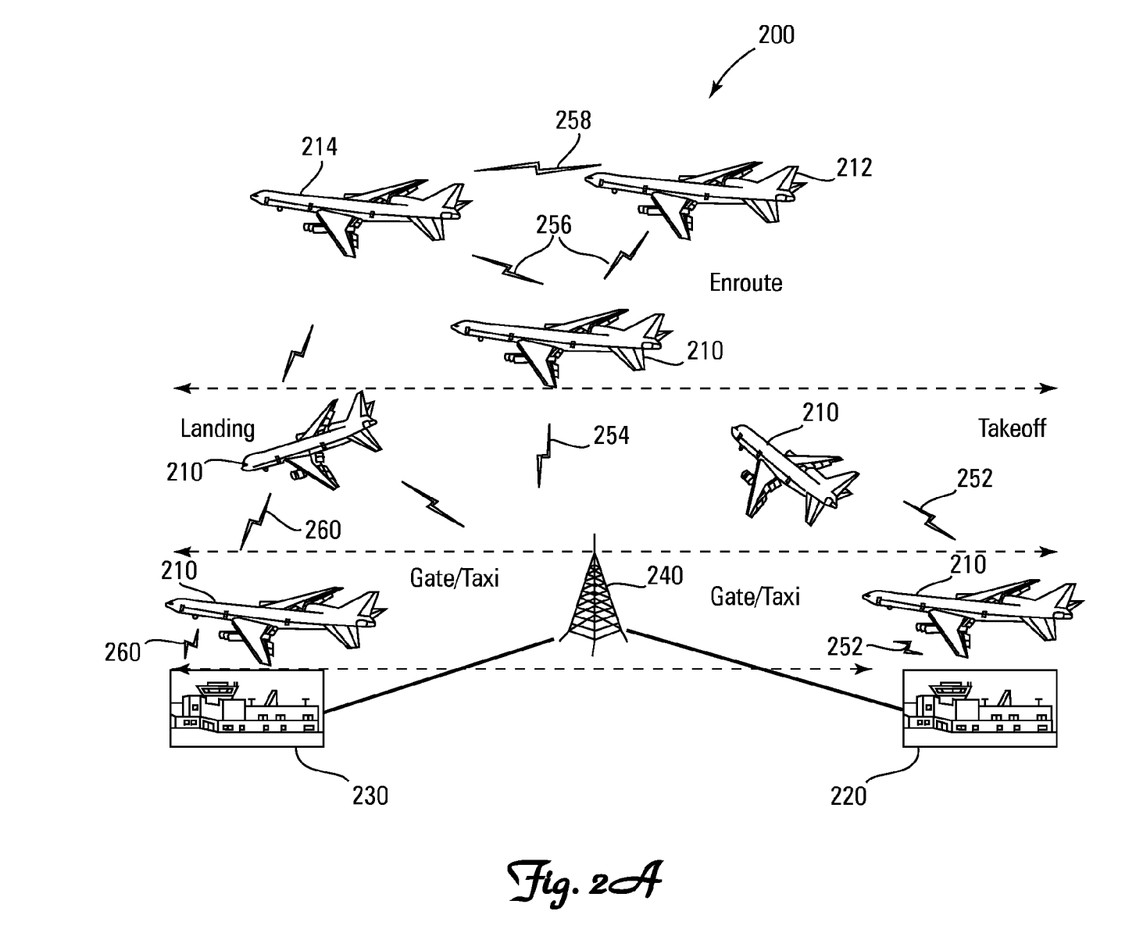
FIGS. 2A-2C show various aspects of an aircraft communication system according one embodiment of the invention.

FIG. 2A shows a WiMax communication system 200 according to one embodiment of the present invention. The communication system 200 operates during different phases of a flight for an aircraft 210 having a WiMax transceiver deployed therein. During an initial gate/taxi phase, aircraft 210 establishes a wireless link 252 to a WiMax base station at an airport 220. During the takeoff phase, link 252 is maintained with the WiMax base station until aircraft 210 is out of range.

At least one ground-based wireless base station 240, such as a WiMax base station, is located on the ground between airport 220 and a destination airport 230. During the en route phase, aircraft 210 establishes a wireless link 254 to base station 240. The aircraft 210 also establishes wireless links 256 with in-flight aircraft 212 and aircraft 214 that each have WiMax transceivers and are out of range with base station 240. The aircraft 212 has a wireless link 258 to aircraft 214. This arrangement of wireless links between each aircraft creates a WiMax subnetwork for air-to-air communication. During the landing phase, aircraft 210 establishes a wireless link 260 with a ground-based wireless base station at airport 230, with link 260 being maintained during the taxi and gate phase at airport 230.

Figure 2B:
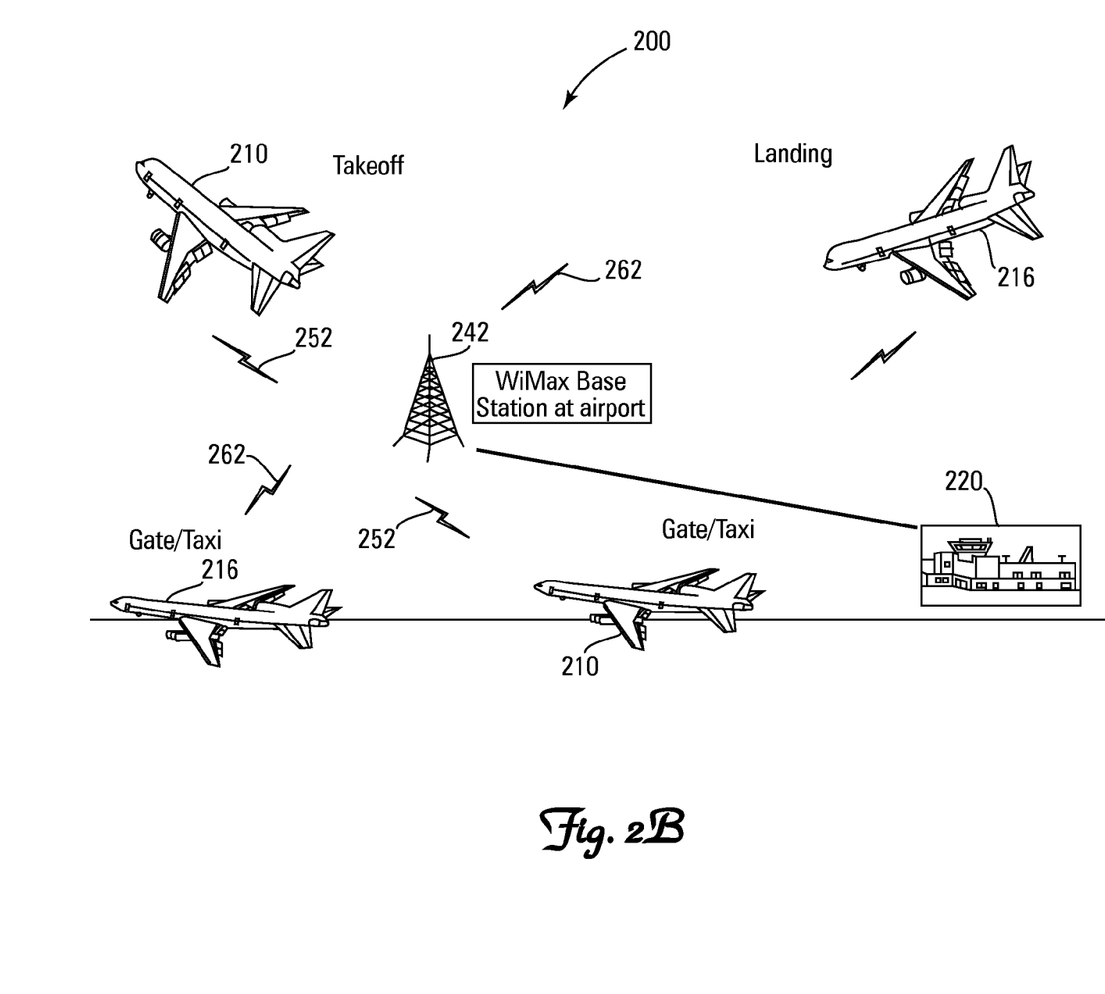

FIG. 2B shows further aspects of WiMax communication system 200 during the gate/taxi phases, as well as the landing and takeoff phases. During the gate/taxi phase before takeoff, aircraft 210 establishes wireless link 252 with a WiMax base station 242 at airport 220. The link 252 is maintained during takeoff until aircraft 210 is out of range. During the landing phase of another aircraft 216 having a WiMax transceiver at airport 220, the aircraft 216 establishes a wireless link 262 with base station 242. The link 262 is maintained during the taxi and gate phase of aircraft 216 at airport 220 as needed.

Figure 2C:
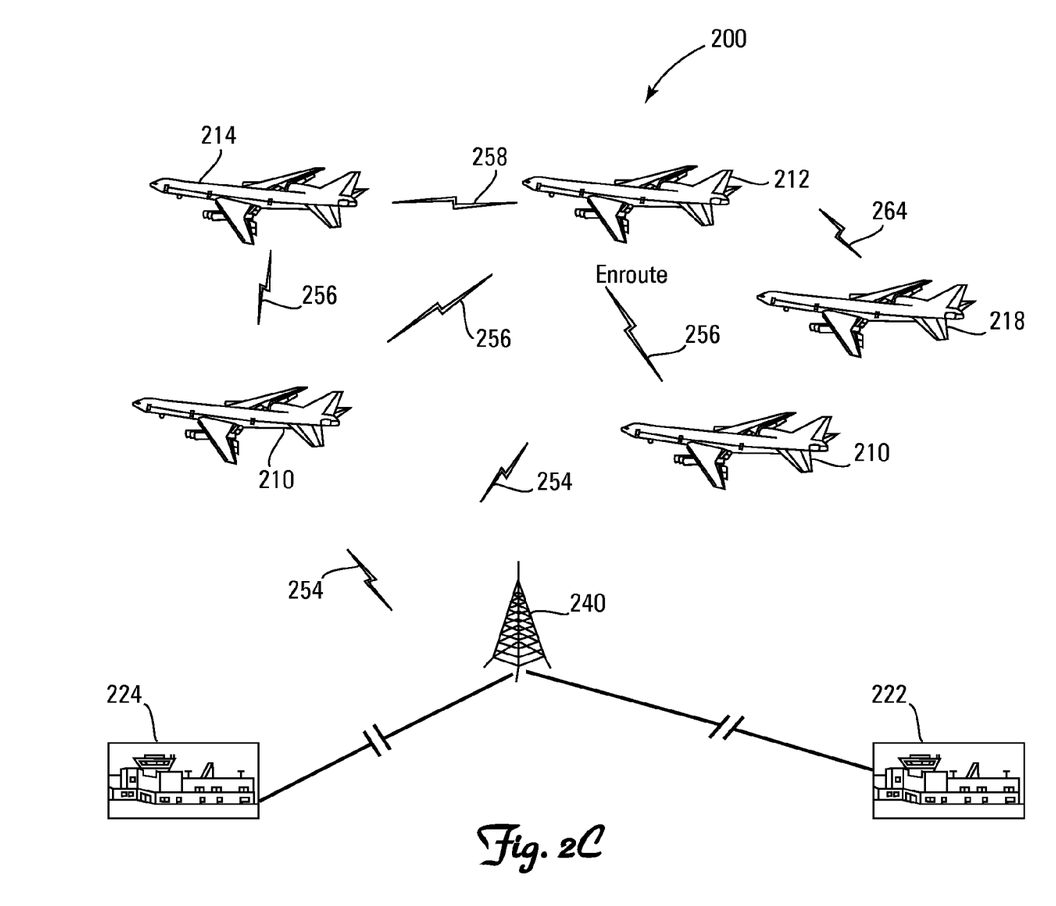

FIG. 2C shows additional aspects of WiMax communication system 200 during the en route phase. During flight, aircraft 210 establishes wireless link 254 to ground-based wireless base station 240. The aircraft 210 also establishes wireless links 256 with in-flight aircraft 212 and aircraft 214 that are out of range with base station 240. The aircraft 212 communicates with aircraft 214 through a wireless link 258. An additional aircraft 218 can establish a wireless link 264 with aircraft 212 to join the subnetwork for air-to-air communications. The base station 240 is in operative communication with an ATC 222 and an AOC 224 at one or more airports, which receive and transmit data from/to base station 240.

In one operation of WiMax communication system 200, en route traffic updates can be computed from aircraft positions retrieved after communicating with different aircraft, and a snap shot of the traffic updates can be downlinked to ATC 222 through base station 240 for better traffic handling. For example, a virtual image can be created based on the positions acquired from the different aircraft for display to the pilot of aircraft 210. A snap shot of this image can be sent to ATC 222 and AOC 224 for computing the en route air traffic. The snap shot of this image can also be sent to the other aircraft 212, 214, 218 that are en route to help their pilots make decisions during a free flight scenario.

Since WiMax has a large bandwidth, high speed, and can cover large distances, the present WiMax subnetwork can be used for data as well as voice communications during different phases of flight. During taxi, takeoff, approach, and landing, there is no limitation to using WiMax as it has a larger radius of coverage. A base station per ground station (airport) can serve to maintain link establishment with many aircraft to download and upload the AOC data and ATC data. During the en route phase (mainly while flying across oceans) the aircraft may go out of the coverage area and result in a "NO COMMUNICATION" condition, during which pilots have to rely upon SATCOM or HF in case no other aircraft are found in the neighboring vicinity for forming a network. The present communication system provides various protocols that can be used in transferring data to desired destinations even when out of the standard coverage areas. These data transfer protocols are described as follows.

Data Store and Forward

In the data store and forward protocol, a network, formed with WiMax base stations deployed in airborne airplanes, can handle and route data from one airplane to another using different channels of the network. Each airplane acts as an intermediate router by storing a message received from another airplane and forwarding the message to a next airplane. This message hopping continues until a desired destination is reached. In case connectivity is lost during the message hopping, the message is stored and routed when it comes under network availability.

Time-Based Data Management

In the time-based data management protocol, timer based data routing ensures priority based data gets routed and reaches the appropriate destination in case a link is not available. The timer based data routing can be implemented when an aircraft is in the air and forms a network with adjacent aircraft in the air. The following timer indicators can be implemented.

If a timer indicates "IMMEDIATE," then a message needs to be transferred immediately. If there is no WiMax connectivity, the message is delivered on other available subnetworks such as VHF, HF or SATCOM.

If the timer indicates "INFINITE," then data can be routed from aircraft to aircraft using the store and forward technique described previously to reach its destination. The data is not time bound and can be routed whenever WiMax connectivity is available.

If the timer has a "FINITE" value (e.g., timer=5 minutes), then the timer is started once the message is sent from the source. The message is routed from aircraft to aircraft until the timer expires. Upon expiration of the timer, the message is transferred over any available subnetwork (e.g., VHF, HF, or SATCOM) from the aircraft in which the message is stored.

Figure 3:
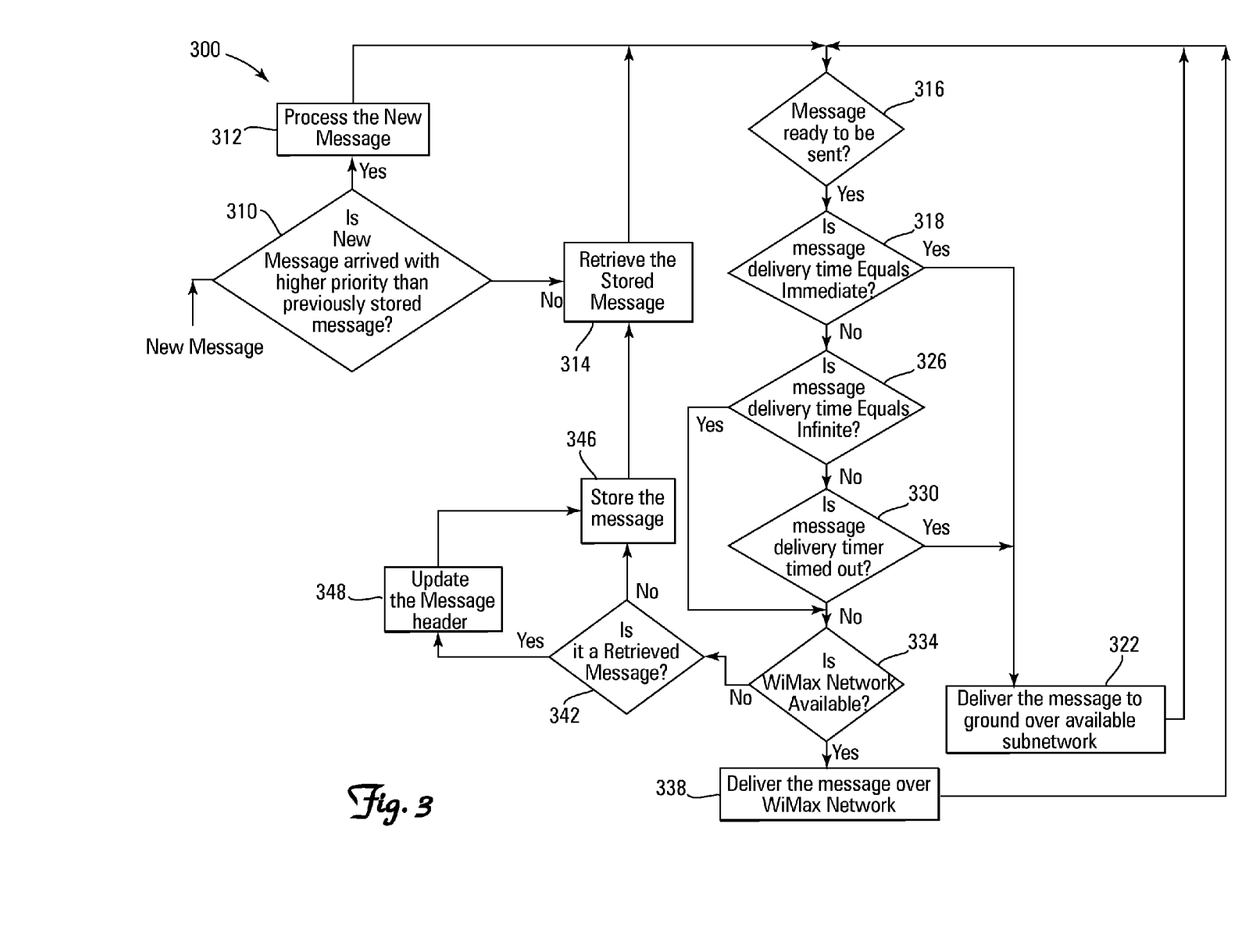
FIG. 3 is a flow chart depicting a method of time-based data management for aircraft communications according to one approach of the invention.

FIG. 3 is a flow chart depicting a method 300 of time-based data management according to one approach that implements the above timers. The method 300 can be implemented as a data routing algorithm in avionics software. In method 300, a new message is received at 310, and a determination is made whether the new message has a higher priority than a previously stored message. If yes, then the new message is processed at 312 for delivery. If the new message does not have a higher priority than a previously stored message, the stored message is retrieved at 314 for delivery.

A determination is then made at 316 whether the new message or retrieved message is ready to be sent. If yes, then a determination is made whether the message delivery time equals immediate at 318. If immediate, then the message is delivered to a ground station over an available subnetwork at 322 (e.g., VHF, HF, or SATCOM), and method 300 is repeated for the next new or retrieved message. If the message delivery time at 318 is not immediate, then a determination is made at 326 whether the message delivery time equals infinite. If not, then a determination is made at 330 whether the message delivery timer has timed out. If yes, then the message is delivered to the ground station over an available subnetwork at 322, and method 300 is repeated for the next new or retrieved message. If the message delivery timer has not timed out at 330, a determination is made whether a WiMax network is available at 334. If yes, the message is delivered over the WiMax network at 338, and method 300 is repeated for the next new or retrieved message. If there is no WiMax connectivity at 334, a determination is made whether the message is a retrieved message at 342. If not, then the message is stored at 346 and method 300 is repeated. If the message is a retrieved message, then a message header is updated at 348, the message is again stored at 346, and method 300 is repeated.

Returning to box decision block 326, if the message delivery time equals infinite, then a determination is made whether a WiMax network is available at 334. If yes, the message is delivered over the WiMax network at 338, and method 300 is repeated. If the WiMax network is not available at 334, a determination is made whether the message is a retrieved message at 342. If not, then the message is stored at 346 and method 300 is repeated. If the message is a retrieved message, then a message header is updated at 348, the message is again stored at 346, and method 300 is repeated.

Data Routing Preference

In this protocol, routing messages between airlines can be achieved by having the option for selecting the data routing preference in an aircraft data base. For example, one routing preference that can be selected is routing only between airplanes of the same airline, such as in the case of secure data needing to be transmitted. Another routing preference that can be selected is routing between airplanes of a given airline and other airplanes of another airline that are tied in with the given airline. An additional routing preference that can be selected is routing between all airplanes of all airlines. A decision manager residing in every airplane computes the best path for which a message can be forwarded to a ground station based on the selected routing preference.

Figure 4:
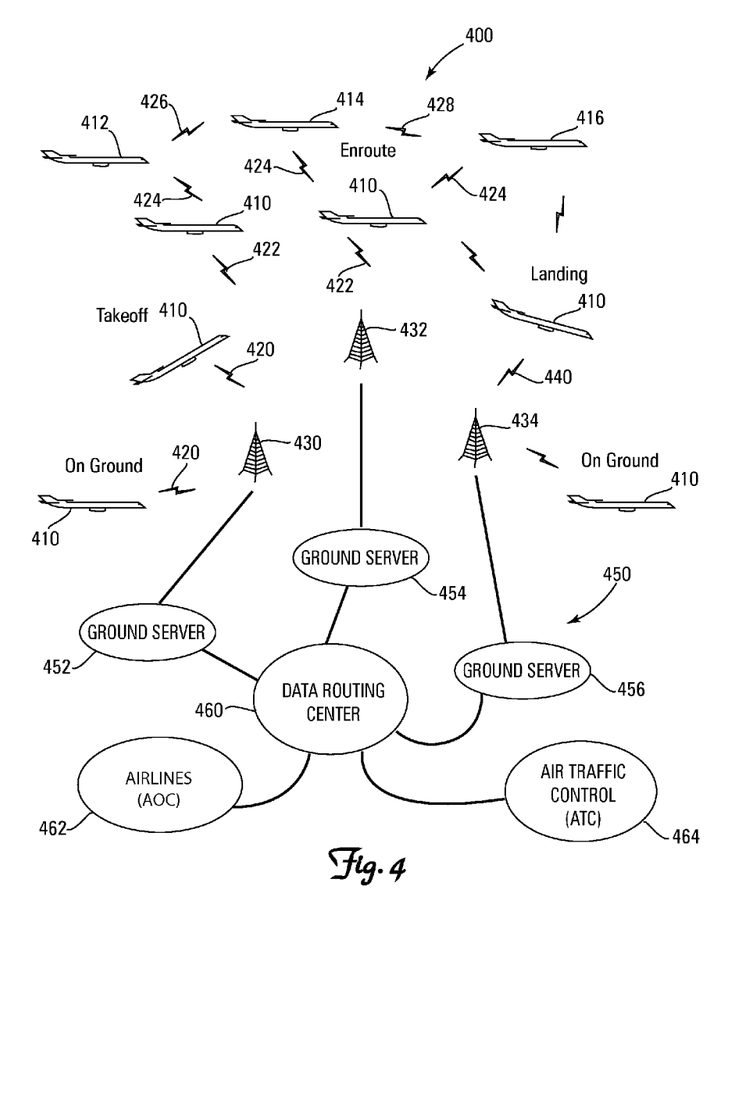
FIG. 4 illustrates an aircraft communication system according to another embodiment of the invention that includes a data routing scheme.

FIG. 4 shows a WiMax communication system 400 according to another embodiment of the invention that includes a data routing scheme. The system 400 operates during different phases of a flight for an aircraft 410 with a WiMax transceiver. While on the ground, aircraft 410 establishes a wireless link 420 to an airport wireless base station 430. The link 420 is maintained during the takeoff phase until aircraft 410 is out of range. During the en route phase, aircraft 410 establishes a wireless link 422 to a ground-based wireless base station 432 in between wireless base station 430 and another ground-based wireless base station 434. The aircraft 410 also establishes wireless links 424 with an aircraft 412, an aircraft 414, and an aircraft 416, each with a WiMax transceiver and which are out of range with base station 432. The aircraft 412 has a wireless link 426 to aircraft 414, and aircraft 414 has a wireless link 428 to aircraft 416. This arrangement of wireless links between each aircraft creates a WiMax subnetwork for air-to-air communication. During the landing phase, aircraft 410 establishes a wireless link 440 with wireless base station 434 near an airport, with link 440 being maintained after the landing of aircraft 410 on the ground.

FIG. 4 further illustrates a data routing system 450 that is implemented with WiMax communication system 400. The data routing system 450 includes a first ground server 452 in operative communication with wireless base station 430, a second ground server 454 in operative communication with wireless base station 432, and a third ground server 456 in operative communication with wireless base station 434. Each of the ground servers are in operative communication with a data routing center 460, which in turn operatively communicates with an AOC 462 and an ATC 464.

Aircraft will have a WiMax link with the ground servers through a respective wireless base station during different phases of flight, with the ground servers being linked to data routing center 460. The data routing center 460 has intelligent control logic built in to route message data to AOC 462 or ATC 464 after processing a message header. The data routing system 450 implemented with WiMax communication system 400 is applicable for both uplink and downlink messaging.

Antenna System

The present communication system can include specially designed antennas for a wireless base station in an aircraft for efficient routing of data from aircraft to aircraft. Such antennas can be employed to enhance radiation patterns for covering the sky and an airport. For example, in one embodiment, in order to efficiently achieve proper data communication between aircraft using the WiMax subnetwork, an omnidirectional antenna and a directional antenna are deployed in an airborne aircraft to communicatively couple a wireless base station in the aircraft with another wireless base station in a different airborne aircraft within a network coverage area.

An aircraft can maintain a data base of other aircraft flying in its vicinity and relative positions of the other aircraft. Steering of the directional antenna depends on a position of the nearby aircraft flying in that vicinity. The omnidirectional antenna aids in finding out the network availability in all directions so that the directional antenna can be steered in the appropriate direction. The data base can be updated with real-time aircraft positions from uplinks sent from ATC/AOC. An aircraft can broadcast its position (e.g., latitude, longitude, altitude, etc.) to all other aircraft with which it establishes a link.

The power level of the antennas can be increased to enhance the WiMax range both in air and for wireless base stations installed on the ground. This makes sure that an aircraft can always maintain a link and upload/download a large amount of data from/to the ground.

Additionally, an increased sensitivity of a wireless base station receiver can be implemented to allow communications from far off aircraft within the coverage area. For example, power levels for WiMax transceivers in aircraft can be controlled through a software mechanism for efficient data transmission. Higher power levels can be employed by adding an additional radio frequency (RF) power stage for increased coverage area to cover air-to-ground communications. The increased RF power transmitted by a wireless base station can be just enough to cover one-half of the area to a next adjacent wireless base station located in the next major adjacent airport.

The present approach provides IP broadband connectivity as against smaller bandwidths like VHF, and also can increase bandwidths over the commercial WiMax deployment because of the increased RF power levels and due to customized antennas for air-to-ground communications.

By using the WiMax subnetwork for air-to-ground and air-to-air networking, costs incurred that are due to service providers can be reduced to a very large extent. Additionally, the WiMax subnetwork increases the coverage area by a wireless base station in air and hence reduces infrastructure cost.

The present WiMax subnetwork provides for a host of applications to be processed on the ground as against in the aircraft, reducing the cost and effort for some of the applications that can be performed on the ground. The WiMax subnetwork can also provide reduced costs of network usage due to dedicated frequencies that can service multiple airplanes. Thus, a large amount of data can be efficiently uploaded or downloaded as needed.

The WiMax subnetwork also helps pilots to make their own decisions and have less dependency on ATC in case of a free flight scenario, as real-time traffic updates of surrounding aircraft can be obtained en route. The WiMax subnetwork also has increased reliability similar to that of VHF stations currently implemented by service providers.

Increased security can be provided with an airline/airport deployed WiMax subnetwork, providing limited access to a local area network (LAN) and encryption for crucial data pertinent data (based on IP ports being used). Encryption of data can be performed at the wireless base stations on the aircraft before being sent across the pubic wide area network (WAN) or LAN. Thus, the present approach addresses the security issues caused by transmitting data between the same or different airlines.

Instructions for carrying out the various process tasks, calculations, and generation of signals and other data used in the operation of the system and method of the invention can be implemented in software, firmware, or other computer readable instructions. These instructions are typically stored on any appropriate computer readable media used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code means in the form of computer executable instructions or data structures. Any of the foregoing may be supplemented by, or incorporated in, specially-designed application-specific integrated circuits (ASICs) or field programmable gate arrays (FPGAs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

The method of the invention can be implemented by computer executable instructions, such as program modules, which are executed by a processor. Generally, program modules include routines, programs, objects, data components, data structures, algorithms, etc. that perform particular tasks or implement particular abstract data types. Computer executable instructions, associated data structures, and program modules represent examples of program code means for executing steps of the methods disclosed herein. The particular sequence of such executable instructions or associated data structures represents examples of corresponding acts for implementing the functions described in such steps.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. An aircraft communication system, comprising:
a first wireless base station deployed in a first aircraft and configured to establish multiple wireless links;
a second wireless base station deployed in a second aircraft and configured to establish multiple wireless links; and
at least one ground-based wireless base station configured to operatively communicate with the first wireless base station or the second wireless base station while the first aircraft and the second aircraft are in flight;
wherein when the first aircraft and the second aircraft are in flight, the first wireless base station and the second wireless base station establish one or more wireless links with each other to create a wireless network for air-to-air communication, such that when one of the first aircraft or second aircraft is out of range with the ground-based wireless base station and the other aircraft is in range with the ground-based wireless base station, the aircraft that is out of range can send a message to the ground-based wireless base station through the aircraft that is in range using a time-based data management protocol comprising:
(a) receiving a new message or retrieving a stored message transmitted by one of the aircraft;
(b) determining whether the message is ready to be sent;
(c) if the message is ready to be sent, determining whether a message delivery time is immediate;
(d) if the message delivery time is immediate, delivering the message to the ground-based wireless base station over an available subnetwork and returning to step (a);
(e) if the message delivery time is not immediate, determining whether the message delivery time is infinite;
(f) if the message delivery time is not infinite, determining whether a message delivery timer has timed out;
(g) if the message delivery timer has timed out, delivering the message to the ground-based wireless base station over an available subnetwork and returning to step (a);
(h) if the message delivery timer has not timed out, determining whether a Worldwide Interoperability for Microwave Access (WiMax) network is available;
(i) if the WiMax network is available, delivering the message over the WiMax network and returning to step (a);

(j) if the WiMax network is not available, determining whether the message is a retrieved message;

(k) if the message is not a retrieved message, storing the message and returning to step (a);

(l) if the message is a retrieved message, updating a message header of the retrieved message, storing the updated retrieved message, and returning to step (a); and (m) if the message delivery time is infinite at step (e), determining whether the WiMax network is available and repeating steps (i) to (l).

2. The system of claim 1, wherein the first wireless base station and the second wireless base station each comprise a WiMax transceiver, or any internet protocol (IP) based wireless transceiver.

3. The system of claim 1, wherein the first wireless base station and the second wireless base station each comprise a directional antenna and an omnidirectional antenna.

4. The system of claim 1, wherein the ground-based wireless base station is in operative communication with an air traffic control (ATC) center and an aeronautical operational control (AOC) center at one or more airports.

5. The system of claim 1, further comprising one or more additional wireless base stations each deployed in additional separate aircraft, the one or more additional wireless base stations configured to establish one or more wireless links with the first and second wireless base stations to form a subnetwork for air-to-air communication.

6. The system of claim 5, wherein at least one of the first aircraft, the second aircraft, or the additional separate aircraft comprises a hot air balloon.

7. The system of claim 1, further comprising a data routing system that comprises:
- a first ground server in operative communication with a first airport wireless base station;
- a second ground server in operative communication with a second airport wireless base station;
- a third ground server in operative communication with the ground-based wireless base station;
- a data routing center in operative communication with each of the first, second, and third ground servers;
- an ATC center in operative communication with the data routing center; and
- an AOC center in operative communication with the data routing center.

8. A method for aircraft air-to-air communications, the method comprising:
- establishing a plurality of wireless links between a plurality of wireless base stations each deployed in a separate one of a plurality of aircraft to create a wireless network while the plurality of aircraft are in flight; and
- routing data transmitted by one or more of the aircraft through the wireless network using one or more data transfer protocols until a desired destination is reached;
- wherein the data transfer protocols comprise at least a time-based data management protocol comprising:
  (a) receiving a new message or retrieving a stored message transmitted by one of the aircraft;
  (b) determining whether the message is ready to be sent;
  (c) if the message is ready to be sent, determining whether a message delivery time is immediate;
  (d) if the message delivery time is immediate, delivering the message to a ground station over an available subnetwork and returning to step (a);
  (e) if the message delivery time is not immediate, determining whether the message delivery time is infinite;
  (f) if the message delivery time is not infinite, determining whether a message delivery timer has timed out;
  (g) if the message delivery timer has timed out, delivering the message to the ground station over an available subnetwork and returning to step (a);
  (h) if the message delivery timer has not timed out, determining whether a Worldwide Interoperability for Microwave Access (WiMax) network is available;
  (i) if the WiMax network is available, delivering the message over the WiMax network and returning to step (a);
  (j) if the WiMax network is not available, determining whether the message is a retrieved message;
  (k) if the message is not a retrieved message, storing the message and returning to step (a);
  (l) if the message is a retrieved message, updating a message header of the retrieved message, storing the updated retrieved message, and returning to step (a); and
  (m) if the message delivery time is infinite at step (e), determining whether the WiMax network is available and repeating steps (i) to (l).

9. The method of claim 8, wherein the wireless base stations each comprise a WiMax transceiver.

10. The method of claim 8, wherein one or more of the plurality of aircraft comprises a hot air balloon.

11. The method of claim 8, wherein at least one of the wireless base stations is in operative communication with a ground-based wireless base station.

12. The method of claim 11, wherein the ground-based wireless base station is in operative communication with an air traffic control center and an aeronautical operational control center at one or more airports.

13. The method of claim 8, wherein the data transfer protocols further comprise a data store and forward protocol, and a data routing preference protocol.

14. The method of claim 13, wherein the data routing preference protocol comprises selecting between one of:
- routing data between airplanes of the same airline;
- routing data between airplanes of a given airline and other airplanes of another airline that are associated with the given airline; and
- routing data between all airplanes of all airlines.

15. An air-to-air communications network, comprising:
- a first node comprising a first Worldwide Interoperability for Microwave Access (WiMax) base station deployed in a first aircraft that is in flight; and
- a second node comprising a second WiMax base station deployed in a second aircraft that is in flight, the second node in operative communication with the first node;
- wherein the first and second nodes provide a WiMax network configured to route data between the aircraft during flight such that when one of the first aircraft or second aircraft is out of range with a ground station and the other aircraft is in range with the ground station, the aircraft that is out of range can send a message to the ground station through the aircraft that is in range using a time-based data management protocol comprising:
  (a) receiving a new message or retrieving a stored message transmitted by one of the aircraft;
  (b) determining whether the message is ready to be sent;
  (c) if the message is ready to be sent, determining whether a message delivery time is immediate;
  (d) if the message delivery time is immediate, delivering the message to the ground station over an available subnetwork and returning to step (a);

(e) if the message delivery time is not immediate, determining whether the message delivery time is infinite;
(f) if the message delivery time is not infinite, determining whether a message delivery timer has timed out
(g) if the message delivery timer has timed out, delivering the message to the ground station over an available subnetwork and returning to step (a);
(h) if the message delivery timer has not timed out, determining whether the WiMax network is available;
(i) if the WiMax network is available, delivering the message over the WiMax network and returning to step (a);
(j) if the WiMax network is not available, determining whether the message is a retrieved message;
(k) if the message is not a retrieved message, storing the message and returning to step (a);
(l) if the message is a retrieved message, updating a message header of the retrieved message, storing the updated retrieved message, and returning to step (a); and
(m) if the message delivery time is infinite at step (e), determining whether the WiMax network is available and repeating steps (i) to (l).

16. The network of claim 15, further comprising one or more additional nodes each comprising a WiMax base station deployed in one or more additional separate aircraft that are in flight, the one or more additional nodes in operative communication with the first and second nodes in the WiMax network.

17. The network of claim 16, wherein at least one of the first aircraft, the second aircraft, or the additional separate aircraft comprises a hot air balloon, with the remaining aircraft comprising one or more airplanes.

18. The network of claim 15, wherein the ground station is in operative communication with an air traffic control center and an aeronautical operational control center at one or more airports.

* * * * *